United States Patent
Zimmerer et al.

(10) Patent No.: US 12,523,313 B2
(45) Date of Patent: Jan. 13, 2026

(54) COMBINATION AIR VALVE

(71) Applicant: Val-Matic Valve & Manufacturing Corporation, Elmhurst, IL (US)

(72) Inventors: Doug Zimmerer, Winfield, IL (US); Timothy M. O'Shea, Palatine, IL (US)

(73) Assignee: Val-Matic Valve & Manufacturing Corporation, Elmhurst, IL (US)

( * ) Notice: Subject to any disclaimer, the term of this patent is extended or adjusted under 35 U.S.C. 154(b) by 0 days.

(21) Appl. No.: 18/741,151

(22) Filed: Jun. 12, 2024

(65) Prior Publication Data

US 2024/0410485 A1  Dec. 12, 2024

Related U.S. Application Data

(60) Provisional application No. 63/507,686, filed on Jun. 12, 2023.

(51) Int. Cl.
F16K 24/04 (2006.01)

(52) U.S. Cl.
CPC ................................. F16K 24/048 (2013.01)

(58) Field of Classification Search
CPC .. F16K 24/048; F16K 31/24; Y10T 137/3099; Y10T 137/7365; Y10T 137/7439
See application file for complete search history.

(56) References Cited

U.S. PATENT DOCUMENTS

| | | | |
|---|---|---|---|
| 1,119,979 A | 12/1914 | Mullligan | |
| 2,661,758 A | 12/1953 | Persha | |
| 2,673,618 A | 3/1954 | Batchelder | |
| 3,394,724 A | 7/1968 | Klinefelter | |
| 3,599,659 A | 8/1971 | Nuter et al. | |
| 3,834,415 A | 9/1974 | Herron | |
| 4,209,032 A | 6/1980 | Drori | |
| 4,230,142 A | 10/1980 | Saarem et al. | |
| 4,730,638 A | 3/1988 | Hazelton | |
| 5,386,844 A | 2/1995 | Kennedy | |
| 5,439,023 A * | 8/1995 | Horikawa | F16K 17/36 137/202 |
| 5,797,434 A * | 8/1998 | Benjey | F16K 17/366 141/46 |
| 6,513,541 B1 * | 2/2003 | Herlihy | F16K 24/042 137/430 |
| 7,481,238 B2 | 1/2009 | Ramoth | |
| 8,689,815 B2 | 4/2014 | Weingarten | |
| 9,194,507 B2 | 11/2015 | Weingarten | |
| 10,683,946 B2 | 6/2020 | Wakeman | |
| 2006/0086388 A1 | 4/2006 | Fye | |
| 2015/0047716 A1 | 2/2015 | Muir et al. | |

FOREIGN PATENT DOCUMENTS

DE  8413483 U1  8/1984
JP  2007298107 A  * 11/2007  ........... F16K 24/048

OTHER PUBLICATIONS

Machine English translation of JP-2007298107-A (Year: 2025).*

* cited by examiner

Primary Examiner — Hailey K. Do
(74) Attorney, Agent, or Firm — Greer, Burns & Crain, Ltd.

(57) ABSTRACT

A combination air valve having a float arm that closes a smaller orifice and a larger orifice. The smaller orifice is configured to release small amounts of air that builds up in the valve and the large orifice is configured to allow for larger releases of air. A single float-operated float arm closes both orifices.

18 Claims, 3 Drawing Sheets

COMBINATION AIR VALVE

CROSS-REFERENCES TO RELATED APPLICATIONS

This application claims the benefit of U.S. Provisional Patent Application No. 63/507,686 filed on Jun. 12, 2023, the entire disclosure of which is incorporated herein by way of reference.

FIELD OF THE INVENTION

The present invention relates to combination air valves.

BACKGROUND OF THE INVENTION

The presence and/or buildup of air in a pipeline can have a negative impact on operations. For example, failure to de-aerate a pipeline can lead to damaged equipment, as well as faulty instrumentation readings. Properly de-aerating the pipeline with the use of automatic air valves will safeguard it from air-related problems.

Air in a pressurized, operating pipeline has three primary sources. First, prior to start-up, the line is not empty; it is full of air. As the line fills with liquid, much of this air will be pushed downstream and released through hydrants, faucets, etc. but a large amount will become trapped at system high points. This phenomenon will occur because air is lighter than water and therefore, will collect at high points.

The second source of air is the incoming water itself. Water contains approximately 2% air by volume based on normal solubility of air in water. The dissolved air will come out of solution with a rise in temperature or a drop in pressure, which will commonly occur at high points due to the increase in elevation.

Finally, air can enter through mechanical equipment such as pumps, fittings, and valves when vacuum conditions occur.

Trapped air can have serious effects on system operation and efficiency. As air pockets collect at high points, a restriction of the flow occurs which produces unnecessary headloss and energy consumption. When passing through a restriction in the line such as a control valve, a dislodged pocket of air can cause surges or water hammer. Water hammer can damage equipment or loosen fittings and cause leakage. Finally, corrosion in the pipe material is accelerated when exposed to the air pocket, which can result in premature failure of the pipeline.

Accordingly, air may be removed with various valves.

Air release valves are probably the best-known air valves. These valves have a small precision orifice in the range of $1/16$ in. (1.6 mm) to $1/2$ in. (13 mm) to release air under pressure continuously during pipeline operation. The air release valve has a float to sense the presence of air and a linkage mechanism that gives the float mechanical advantage in opening the orifice under full pipeline pressures.

Air release valves have a limited capacity for admitting and exhausting air because of their small orifice. For this reason, most pipeline locations require both air release and air/vacuum valves for exhausting and admitting large volumes of air.

An air/vacuum valve is usually installed downstream of pumps and at high points to exhaust large volumes of air during pump start-up and pipeline filling. The valve also will admit large volumes of air to prevent a vacuum condition from occurring in the pipeline and to allow for draining. A float in the valve rises with the water level to shut off the valve when the air has been exhausted. Upon the loss of pressure due to draining, line break, or column separation, the float will drop and allow air to reenter the pipe. It is important to note that under normal operation, the float is held closed by the line pressure and will not relieve accumulated air. An air release valve is needed to relieve air during system operation.

Combination air valves perform the functions of an air/vacuum valve (exhaust large quantities of air on start-up, admit air on shut-down) and air release valves (release air continuously during operation) to maintain system efficiency and prevent pipeline surges. A combination valve contains both a small air release orifice and a large air/vacuum port in one assembly.

Therefore, there is an ongoing need for effective and efficient combination air valves.

SUMMARY OF THE INVENTION

The new combination air valve may be used in pipelines to exhaust large quantities of air (for example during start-up or shut-down) and is also able to continuously release air that accumulates during operation to maintain system efficiency and prevent pipeline surges.

Accordingly, in an aspect, the present invention may generally be characterized as providing a combination air valve for a fluid system having: a valve body having an internal cavity, a first orifice, and a second orifice, each said orifice configured to release air from the valve body; a float disposed within the internal cavity; and a float arm pivotably mounted to the valve body on a first end and mounted to the float on a second end opposite the first end, the float arm further comprising a button on the first end. The button is configured to seal the first orifice by surrounding a first opening of the first orifice. The second end is configured to seal the second orifice.

The float arm may have an open position in which air is released from the second orifice and a closed position in which the second orifice is closed, and the float arm is configured to control air release through the first orifice in the open position and the closed position.

The combination air valve may also include a plug disposed adjacent to the second orifice and configured to seal the second orifice. The float arm may include an indentation on the second end of the float arm, and the indentation may be configured to removably engage with a bottom end of the plug.

The first orifice may be configured to release air when the second orifice is sealed.

The float may be pivotably mounted to the first end of the float arm. The float arm may be configured to push the plug to a closed position in which the second orifice is sealed, and the float arm may be configured to be out of contact with the plug when the second orifice is in an open position.

The valve body may include a valve body inlet and a valve body outlet. The valve body inlet defines an inlet axis and the valve body outlet defines an outlet axis. The inlet axis may be substantially perpendicular to the outlet axis.

In another aspect, the present invention may generally be characterized as providing a combination air valve for a fluid system having: a valve body having an internal cavity, a first orifice, and a second orifice, each said orifice configured to release air from the valve body; a float disposed within the internal cavity; a plug disposed adjacent to the second orifice; and a float arm pivotably mounted to the valve body on a first end and mounted to the float on a second end opposite the first end. The float arm may be configured to push the plug to a closed position in which the second orifice is sealed, and the float arm may be configured to be out of contact with the plug when the second orifice is in an open position.

The float arm may have an open position in which air is released from the second orifice and a closed position in which the second orifice is closed, and the float arm may be configured to control air release through the first orifice in the open position and the closed position.

The float arm may include a button on the first end of the float arm, and the button may be configured to seal the first orifice by surrounding a first opening of the first orifice.

The float arm may include an indentation on the second end of the float arm, and the indentation may be configured to removably engage with a bottom end of the plug.

The first orifice may be configured to release air when the second orifice is sealed.

The float may be s pivotably mounted to the first end of the float arm.

The valve body may include a valve body inlet and a valve body outlet. The valve body inlet defines an inlet axis and the valve body outlet defines an outlet axis, and the inlet axis may be substantially perpendicular to the outlet axis.

In another aspect, the present invention may generally be characterized as providing an air valve for automatically admitting and releasing air, the air valve includes: a body with an inlet configured to be connected to a piping system; a float-operated float arm that pivots about a fulcrum mounted inside the body; a first outlet orifice that leads to ambient atmosphere and that is alternately closed when water fills the valve by a plug, the plug urged into a closed position through contact with the float-operated float arm, the plug configured to remain in the closed position when water has filled the valve or when the valve is at operating pressure; and a second outlet orifice that leads to ambient atmosphere and that is alternately closed by a seal on the float-operated float arm when water fills the valve, the seal configured to close the second orifice only when water has filled the valve and causes the float-operated float arm to move upward. A center of the second outlet orifice is located closer to the fulcrum of the float-operated float arm than a center of the first outlet orifice.

A cammed surface on the float-operated float arm may contact a rounded bottom surface of a stem of the plug.

A distance between the center of the second outlet orifice and the fulcrum of the float-operated float arm may be less than two times a diameter of the second outlet orifice.

The plug may seal against a flat surface, above which a contour of the first outlet orifice begins with a conical profile that tapers to a cylindrical port with a diameter greater than or equal to a nominal size of the valve.

DESCRIPTION OF THE DRAWINGS

Embodiments of the invention are described in more detail with reference to the accompanying schematic drawings in which.

DESCRIPTION OF THE INVENTION

As indicated above, a new combination air valve has been invented. In the new combination air valve, a float arm is mounted to a valve body on a first end and pivotably mounted to a float on the other, opposite end. There are two orifices in the valve, one for large volumes of air that is sealed by a plug being contacted by the float arm, and a smaller one that is sealed by an orifice button. The orifice button is located on the float arm, closer to the first end of the float arm than the second end. As the float moves up and down, the two orifices will be opened and closed by the float arm. This allows the same float arm to control the opening of the small orifice and the large orifice and to release air from the desired orifice as needed. The plug can remain shut via the pressure in the body allowing orifice button to open and close. Additionally, a mesh/screen for debris may be included in the valve, and fins, may be located within the elbow. The valve may be plastic.

With this general understanding of the invention, preferred embodiments, with reference to the attached drawings will now be described with the understanding that the following description is not intended to be limiting.

Figure 1:
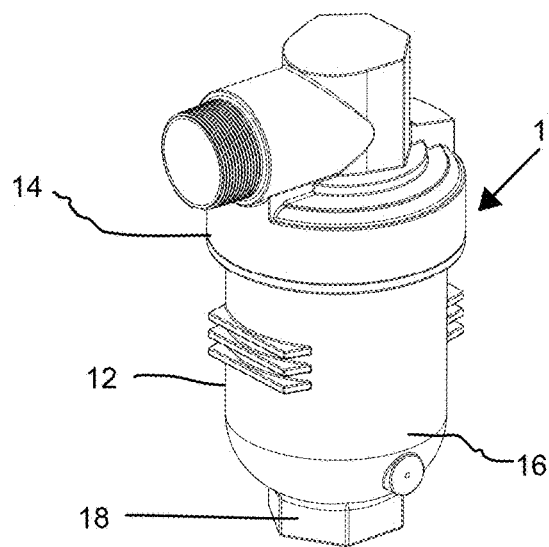
FIG. 1 shows a top and right-side perspective view of a valve according to one or more embodiments of the present invention.
Figure 2:
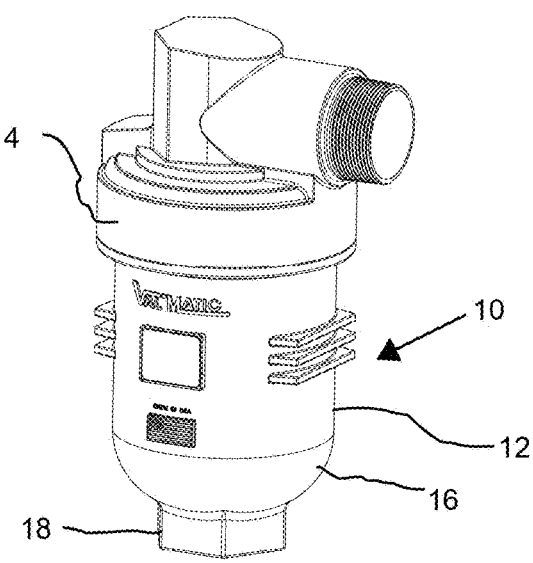
FIG. 2 shows a top and left-side perspective view of the valve shown in FIG. 1.

With reference to FIGS. 1 and 2, a combination air valve 10 includes a body 12 which may be formed by upper and lower body portions 14, 16 removably connected to each other. The body 12 includes an inlet 18 which is configured to allow the combination air valve 10 to be connected to a piping system to receive a liquid which includes gas.

Figure 3:
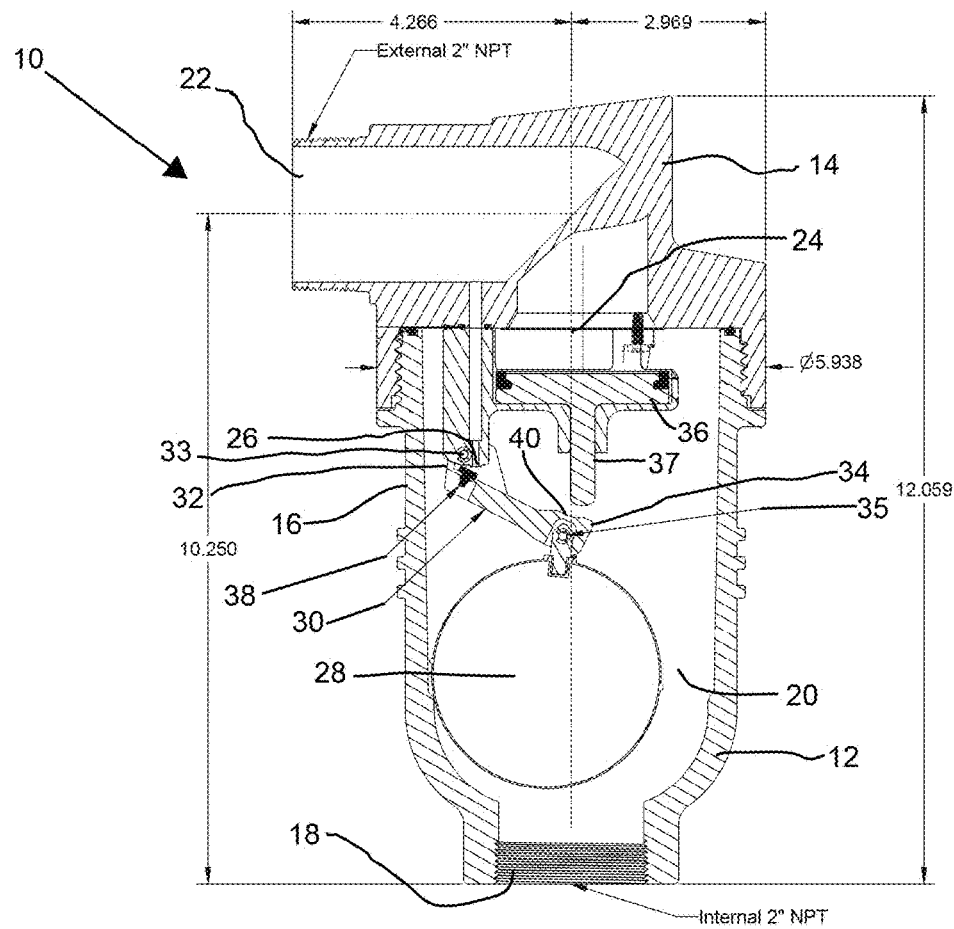
FIG. 3 shows a right side, cutaway view of the valve shown in FIG. 1, with both the small orifice and the large orifice open.
Figure 4:
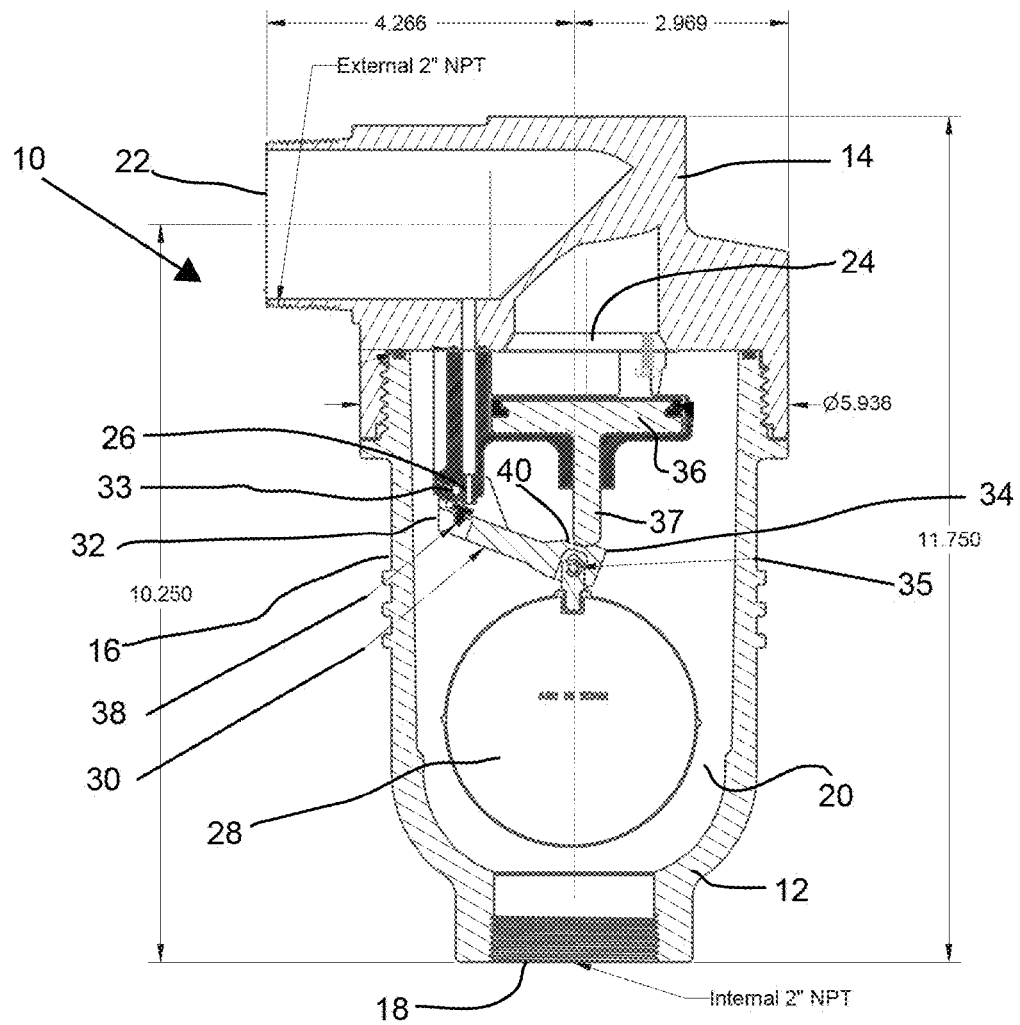
FIG. 4 shows a right side, cutaway view of the valve shown in FIG. 1 with the float arm contacting the plug of the large orifice, while the large orifice is open; and, FIG. 5 shows a right side, cutaway view of the valve shown in FIG. 1 with the plug closing the large orifice.
Figure 5:
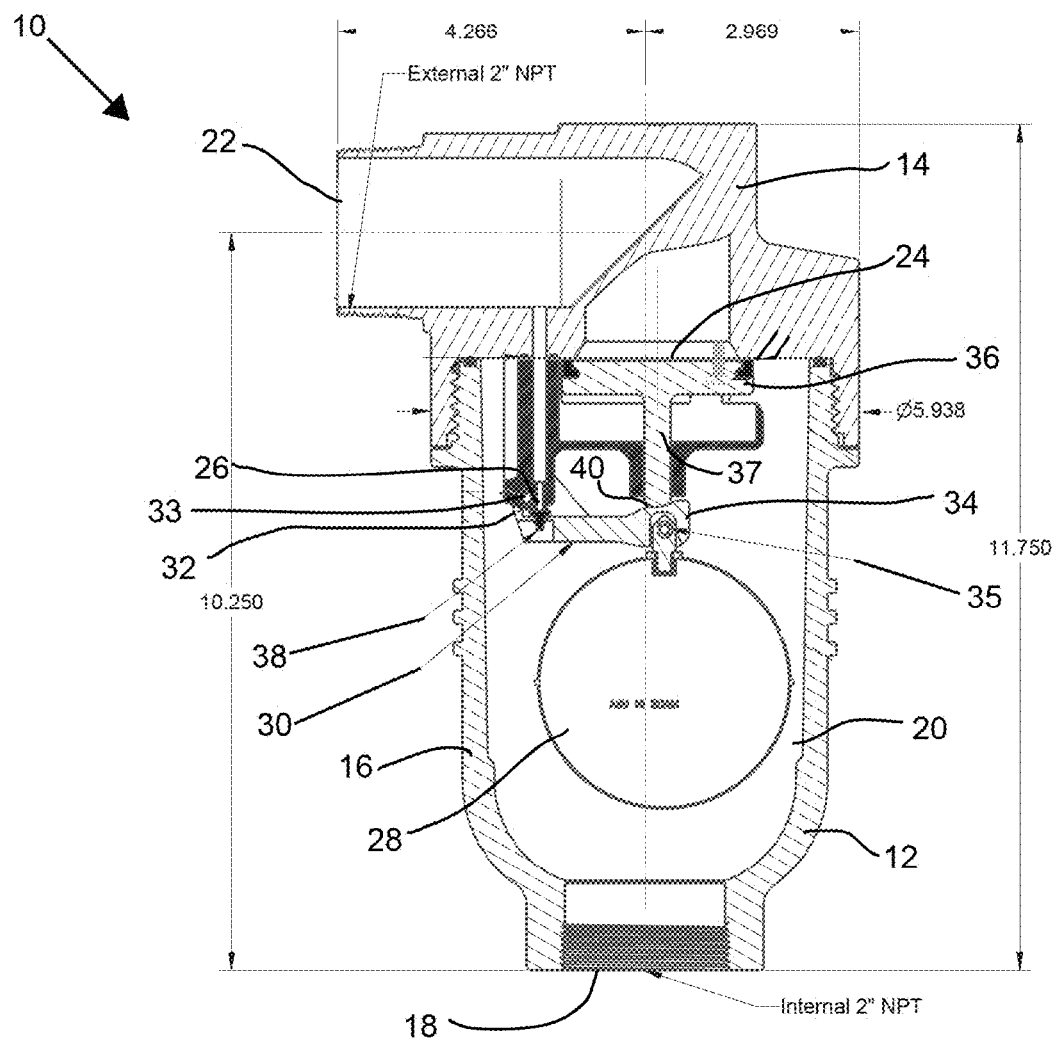

Turning to FIGS. 3 to 5, the body 12 also has an internal cavity 20 and an outlet 22. Finally, two orifices 24, 26 are provided which allow for communication between the internal cavity 20 and the ambient atmosphere, via the outlet 22. An axis of the outlet 22 may be perpendicular to an axis of the inlet 18.

As can be seen in FIGS. 3 to 5, a float 28 is provided inside of the body 12. A float arm 30 has a first end 32 pivotably mounted to the body 12 with a pin 33. A second end 34 of the float arm 30 is pivotably connected to the float 28 with a second pin 35.

The two orifices 24, 26 have different sizes and the larger orifice 24 is for large volumes of air and is sealed by a plug 36 and the smaller orifice 26 is sealed by an orifice button 38. The orifice button 38 is located on the float arm 30, closer to the first end 32 of the float arm 30 than the second end 34. The plug 36 has a stem 37 which extends away from the orifice 24 and towards the float arm 30.

As the float 28 moves up and down, the two orifices 24, 26 will be closed and opened by the float arm 30. This allows the same float arm 30 to control the opening of the small orifice 26 and the large orifice 24 and to release air from the desired orifice 24, 26 as needed. The plug 36 can remain shut via the pressure in the body 12, allowing the orifice button 38 to open and close.

Additionally, a mesh/screen for debris may be included in the valve 10, for example, proximate the outlet 22. Further, fins (not depicted) may be located within an elbow of the upper body portion 14. The valve 10 may be plastic.

In the present invention, the large orifice 24 and small orifice 26 are separated from one another and closed with the common float-operated float arm 30. A benefit of arranging these orifices 24, 26 in this manner is that the small orifice 26 only needs to have the orifice button 38 move a small distance away to create unobstructed full-flow area, but the distance from the center of the small orifice 26 to the fulcrum should be minimized to get the highest possible mechanical advantage on the float arm 30, so that the weight of the float 28 and float arm 30 (in the absence of water lifting the float 28) will be sufficient to open the small orifice 26 against a high amount of air pressure (300 psi) trying to hold it closed. Conversely, the large orifice 24, which facilitates high-flow low-differential-pressure filling and draining of a piping system, needs the float arm 30 to move far away to allow it to reach the full-open position, which is a stroke equal to one quarter of the nominal valve size to guarantee full flow area. The large orifice 24, however, does not need an appreciable amount of mechanical advantage though since it does not reopen under pressure like the small orifice 26.

To make sure that the large orifice 24 of an air/vacuum or combination air valve is able to offer proper vacuum protection to a line, the industry standard requires that a cross-sectional flow area equal to or greater than the nominal size of the valve be maintained throughout the entire flow path of the valve 10. This imposes a minimum size on the large orifice 24 and related components.

Additionally, many applications have pressures as high as 300 psi. It would be desirable to have a single valve that is able to cover all of those applications. This would require a small orifice 26 of a certain size that would open to vent pressure (when air accumulates causing the water level in the valve to fall) up to that 300 psi threshold. As stated above this, requires maximizing the mechanical advantage of the float arm 30.

Many of the combination air valves produced for municipal applications are large and heavy, making them expensive to produce and difficult to handle and install. The present valve is a lightweight air valve of minimal size.

In the present invention, a cammed surface, or indentation, 40 is provided on a top or upper surface of the float arm 30 to engage a rounded nose of the stem 37 of the plug 36. Such a shaped surface 40 facilitates proper closure of the large orifice 24 of the valve 10 during an initial inrush of water. Often combination air valves are used to vent large amounts of air from a piping system in a short amount of time as water fills the piping system rapidly. One such instance is during the start-up of a pump. As the final volume of air is expelled through the air valve, water rapidly and turbulently enters the valve body and can begin to bypass the plug and escape through the large orifice. A reason to provide an automatic air valve during the filling of a piping system is to get all the air out, but keep the water in. Therefore, an effective and efficient valve, like the present valve, should be capable of responding rapidly to the inrush of water, such that as soon as the water begins to push the float 28 upward, the float arm 30 begins to move upward, and the float arm 30 begins to push the plug 36 upward. Even a momentary hesitation of the plug 36 can result in gallons of water escaping through the large orifice 24 during closure. Accordingly, the present valve utilizes the cammed surface 40 on the top of the float arm 30 where it engages the stem 37 of the plug 36 to ensure smooth operation of the plug 36 during closure.

As mentioned above, one of the aspects of the present valve design is the maximization of the mechanical advantage of the float arm 30 as it seals the large orifice 24. This allows the valve 10 to function at an operating pressure of 300 psi, while maintaining (?) the size of the small orifice 26 and the compact length of the float arm 30 and compact size of the float 28, which facilitated an overall small size and lower cost of the valve 10. Thus, a center of the small orifice 26 is positioned as close as possible to the fulcrum of the float arm 30. For example, on an exemplary valve according to the present invention, the small orifice 26 has a 0.094" diameter, and its centerline is located only 0.180" laterally from the fulcrum of the float arm 30, which is less than 2.0 times the diameter of the small orifice 26.

In order to maximize the flow capacity of the valve 10 (amount of outflowing or inflowing subsonic air through the large orifice at a given differential pressure), the present valve 10 utilizes a 60° nozzle shape above the large orifice. On an exemplary valve according to the present invention, the nozzle surface begins to at a diameter of 2.275" and then tapers-down to the nominal size of 2.000" through a 60° included-angle (30° per side) nozzle chamfer on the cover of the valve. In a computational fluid dynamics simulation, this resulted in a large improvement in the flow capacity of the valve.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

The invention claimed is:

1. A combination air valve for a fluid system, comprising:
    a valve body having an internal cavity, a first orifice, and a second orifice, both orifices configured to release air from the valve body,
    a float disposed within the internal cavity, and
    a float arm pivotably mounted to the valve body on a first end and mounted to the float on a second end opposite the first end, the float arm further comprising a button on the first end;
    wherein the button is configured to seal the first orifice by surrounding a first opening of the first orifice, and
    wherein the second end is configured to seal the second orifice,
    wherein the float is pivotably mounted to the second end of the float arm,
    wherein the float arm is configured to push a plug to a closed position in which the second orifice is sealed, and
    wherein the float arm is configured to be out of contact with the plug when the second orifice is in an open position.

2. The combination air valve of claim 1, wherein the float arm has an open position in which air is released from the second orifice and a closed position in which the second orifice is closed, and
    wherein the float arm is configured to control air release through the first orifice in the open position and the closed position.

3. The combination air valve of claim 1, wherein the first orifice is configured to release air when the second orifice is sealed.

4. The combination air valve of claim 1, further comprising:
a plug disposed adjacent to the second orifice and configured to seal the second orifice.

5. The combination air valve of claim 4, wherein the float arm comprises an indentation on the second end of the float arm, and
wherein the indentation is configured to removably engage with a bottom end of the plug.

6. The combination air valve of claim 1, the valve body further comprising a valve body inlet and a valve body outlet.

7. The combination air valve of claim 6, wherein the valve body inlet defines an inlet axis, wherein the valve body outlet defines an outlet axis, and
wherein the inlet axis is substantially perpendicular to the outlet axis.

8. A combination air valve for a fluid system, comprising:
a valve body having an internal cavity, a first orifice, and a second orifice, both orifices configured to release air from the valve body,
a float disposed within the internal cavity,
a plug disposed adjacent to the second orifice, and
a float arm pivotably mounted to the valve body on a first end and mounted to the float on a second end opposite the first end;
wherein the float arm is configured to push the plug to a closed position in which the second orifice is sealed, and
wherein the float arm is configured to be out of contact with the plug when the second orifice is in an open position,
wherein the float arm comprises an indentation on the second end of the float arm, and
wherein the indentation is configured to removably engage with a bottom end of the plug.

9. The combination air valve of claim 8, wherein the float arm has an open position in which air is released from the second orifice and a closed position in which the second orifice is closed, and
wherein the float arm is configured to control air release through the first orifice in the open position and the closed position.

10. The combination air valve of claim 8, the float arm further comprising a button on the first end of the float arm, and
wherein the button is configured to seal the first orifice by surrounding a first opening of the first orifice.

11. The combination air valve of claim 8, wherein the first orifice is configured to release air when the second orifice is sealed.

12. The combination air valve of claim 8, wherein the float is pivotably mounted to the second end of the float arm.

13. The combination air valve of claim 8, the valve body further comprising a valve body inlet and a valve body outlet.

14. The combination air valve of claim 13, wherein the valve body inlet defines an inlet axis and the valve body outlet defines an outlet axis, and
wherein the inlet axis is substantially perpendicular to the outlet axis.

15. An air valve for automatically admitting and releasing air, the air valve comprising:
a body with an inlet configured to be connected to a piping system,
a float-operated float arm that pivots about a fulcrum mounted inside the body,
a first outlet orifice that leads to ambient atmosphere and that is alternately closed when water fills the valve by a plug, the plug urged into a closed position through contact with the float-operated float arm, the plug configured to remain in the closed position when water has filled the valve or when the valve is at operating pressure,
a second outlet orifice that leads to ambient atmosphere and that is alternately closed by a seal on the float-operated float arm when water fills the valve, the seal configured to close the second orifice only when water has filled the valve and causes the float-operated float arm to move upward,
wherein a center of the second outlet orifice is located closer to the fulcrum of the float-operated float arm than a center of the first outlet orifice,
wherein a cammed surface on the float-operated float arm contacts a rounded bottom surface of a stem of the plug.

16. The air valve of claim 15, wherein a distance between the center of the second outlet orifice and the fulcrum of the float-operated float arm is less than two times a diameter of the second outlet orifice.

17. The air valve of claim 15, wherein the plug seals against a flat surface, above which a contour of the first outlet orifice begins with a conical profile that tapers to a cylindrical port with a diameter greater than or equal to a nominal size of the valve.

18. An air valve for automatically admitting and releasing air, the air valve comprising:
a body with an inlet configured to be connected to a piping system,
a float-operated float arm that pivots about a fulcrum mounted inside the body,
a first outlet orifice that leads to ambient atmosphere and that is alternately closed when water fills the valve by a plug, the plug urged into a closed position through contact with the float-operated float arm, the plug configured to remain in the closed position when water has filled the valve or when the valve is at operating pressure,
a second outlet orifice that leads to ambient atmosphere and that is alternately closed by a seal on the float-operated float arm when water fills the valve, the seal configured to close the second orifice only when water has filled the valve and causes the float-operated float arm to move upward,
wherein a center of the second outlet orifice is located closer to the fulcrum of the float-operated float arm than a center of the first outlet orifice, and,
wherein the plug seals against a flat surface, above which a contour of the first outlet orifice begins with a conical profile that tapers to a cylindrical port with a diameter greater than or equal to a nominal size of the valve.

* * * * *